US007835768B2

(12) United States Patent
Crozzoli et al.

(10) Patent No.: US 7,835,768 B2

(45) Date of Patent: Nov. 16, 2010

(54) ANTENNA SYSTEM AND METHOD FOR CONFIGURING A RADIATING PATTERN

(75) Inventors: Maurizio Crozzoli, Turin (IT); Daniele Disco, Turin (IT); Paolo Gianola, Turin (IT)

(73) Assignees: Telecom Itala S.p.A., Milan (IT); Pirelli & C. S.p.A., Milan (IT)

(*) Notice: Subject to any disclaimer, the term of this patent is extended or adjusted under 35 U.S.C. 154(b) by 195 days.

(21) Appl. No.: 10/575,354

(22) PCT Filed: Oct. 23, 2003

(86) PCT No.: PCT/IT03/00655

§ 371 (c)(1), (2), (4) Date: Apr. 11, 2006

(87) PCT Pub. No.: WO2005/041353

PCT Pub. Date: May 6, 2005

(65) Prior Publication Data

US 2007/0149250 A1 Jun. 28, 2007

(51) Int. Cl.
*H04M 1/00* (2006.01)

(52) U.S. Cl. .................... 455/562.1; 455/63.4; 455/561

(58) Field of Classification Search ............. 455/562.1, 455/426.1, 448, 63, 561, 63.4, 101
See application file for complete search history.

(56) References Cited

U.S. PATENT DOCUMENTS 5,917,455 A 6/1999 Huynh et al.
6,055,230 A * 4/2000 Feuerstein et al. .......... 370/335
6,188,912 B1 * 2/2001 Struhsaker et al. .......... 455/561
6,366,237 B1 4/2002 Charles
6,526,102 B1 * 2/2003 Piirainen .................... 375/297

(Continued)

FOREIGN PATENT DOCUMENTS

EP 1 315 235 A1 5/2003

OTHER PUBLICATIONS

Savazzi, "High Speed Optical Data Link for Smart Antenna Radio System", Multiaccess, Mobility and Teletraffic for Wireless Communications Conference, Venice, Italy, pp. 1-5, Oct. 6-8, 1999.

(Continued)

*Primary Examiner*—Lana N Le
*Assistant Examiner*—Ping Y Hsieh
(74) *Attorney, Agent, or Firm*—Finnegan, Henderson, Farabow, Garrett & Dunner, L.L.P.

(57) ABSTRACT

The radiation characteristics of an antenna are made configurable including in the antenna a plurality of radiating elements and associating to each of said radiating elements a respective chain for processing the signal in transmission and/or reception with a module for weighting digital signals capable of applying to a digital signal at least a respective weighting coefficient and an antenna conversion set interposed between the module for weighting digital signals and one of the radiating elements of the antenna. The antenna conversion set operates on a digital signal on the side of the signal weighting module and on an analogue signal distributed on the processing chains associated to each radiating element of the antenna propagates (in transmission and/or reception), while respective weight coefficients are applied to said digital signal weighting modules. The weighting coefficients determine the radiation diagram of the antenna.

37 Claims, 4 Drawing Sheets

U.S. PATENT DOCUMENTS

Figure 1:
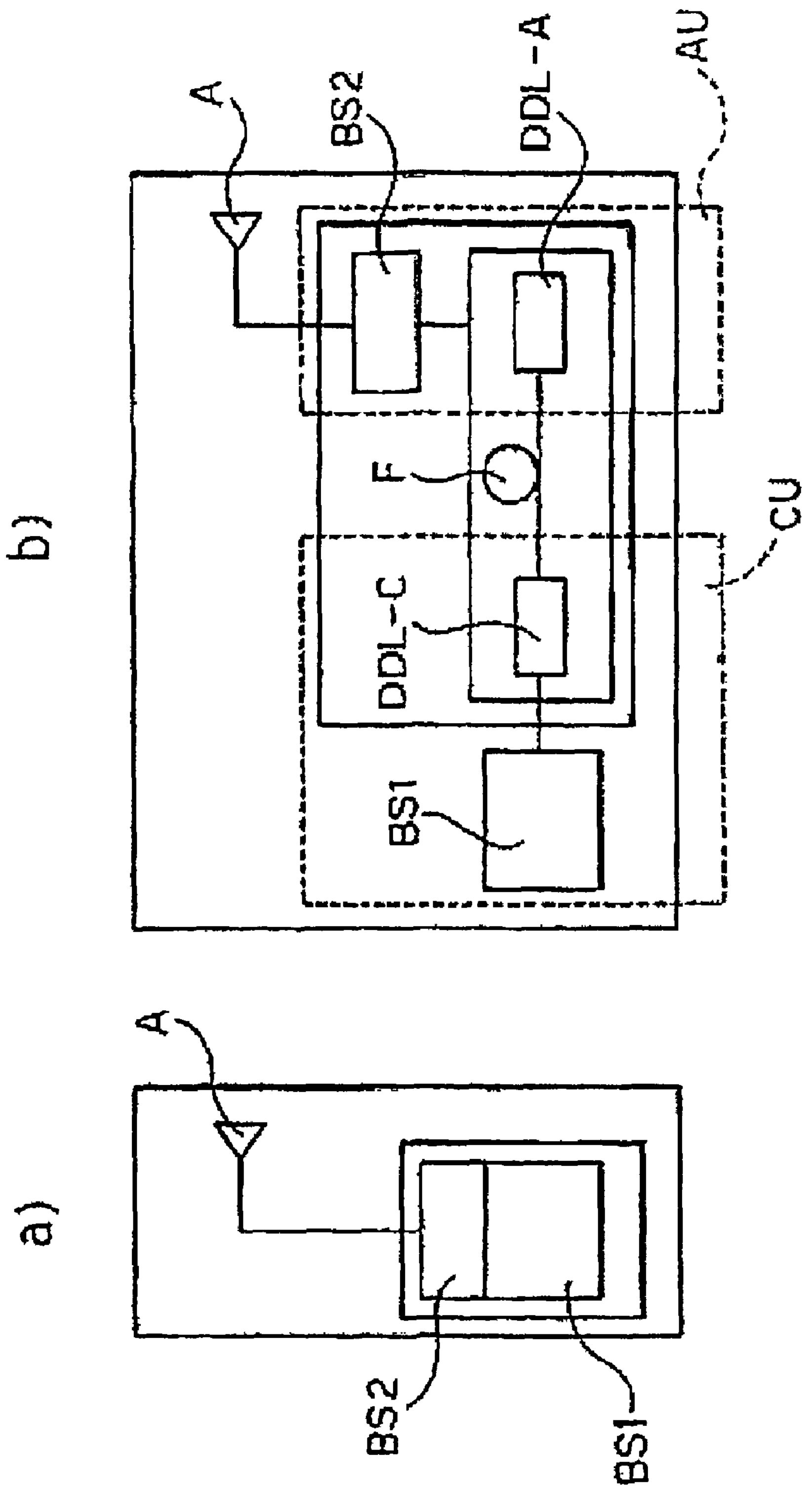

| | | | | |
|---|---|---|---|---|
| 7,203,519 | B2 * | 4/2007 | Ylitalo | 455/562.1 |
| 7,257,425 | B2 * | 8/2007 | Wang et al. | 455/562.1 |
| 7,280,848 | B2 * | 10/2007 | Hoppenstein | 455/561 |
| 2003/0032424 | A1 * | 2/2003 | Judd et al. | 455/426 |
| 2003/0032454 | A1 | 2/2003 | Judd | |
| 2003/0092469 | A1 * | 5/2003 | Takano | 455/562 |
| 2004/0038714 | A1 * | 2/2004 | Rhodes et al. | 455/562.1 |
| 2006/0121944 | A1 * | 6/2006 | Buscaglia et al. | 455/561 |

OTHER PUBLICATIONS

Lo, et al., "Antenna Handbook, Theory, Applications, and Design," Van Nostrand Reinhold Company, New York, 1988, Contents (2 pages), Chapter 11 (pp. 11-1 to 11-91), Chapter 13 (pp. 13-1 to 13-68), Chapter 14 (pp. 14-1 to 14-37), Chapter 18 (pp. 18-1 to 18-30), and Chapter 19 (pp. 19-1 to 19-122).

Liberti, et al., "Smart Antennas for Wireless Communications", IS-95 and Third Generation CDMA Applications, Prentice Hall, Chapter 3, pp. 1-5, (1999).

Lo, et al., "Antenna Handbook—Theory, Applications, and Design", Van Nostrand Reinhold, New York, pp. 1-2 of Contents, (1988).

Van Veen, et al., "Beamforming: A Versatile Approach to Spatial Filtering", IEEE ASSP Magazine, pp. 4-24, (Apr. 1988).

* cited by examiner

ANTENNA SYSTEM AND METHOD FOR CONFIGURING A RADIATING PATTERN

CROSS REFERENCE TO RELATED APPLICATION

This application is a national phase application based on PCT/IT2003/000655, filed Oct. 23, 2003, the content of which is incorporated herein by reference.

FIELD OF THE INVENTION

The present invention relates to the techniques that allow to achieve control over the radiation pattern (in transmission and/or reception) of an antenna formed by an array of radiating elements (array antenna). As is well known, such antennas offer the capability of setting nearly any shape for the radiation pattern, provided it is compatible with classic array antenna theory.

DESCRIPTION OF THE PRIOR ART

Specific research in the sector and the technological evolution of recent years have allowed to design and build particular radiating systems that are capable of deeply modifying the substantially passive role of traditional antennas used for applications in the field of telecommunications and in particular for the Radio Base Stations (RBS) of mobile communication systems.

In this context, the antenna is the final element of the planning process which, based on a series of design parameters, determines the coverage areas as a function of variables such as site position, cell orientation, radiated power, antenna type, etc., and in which the frequencies in use (GSM, GPRS) or the spreading and scrambling codes (UMTS) may also be assigned.

Downstream of this process, in traditional contexts some of the choices made can no longer be modified, unless on site interventions are made, such as mechanical changes to antenna beam orientation, or the antenna model is replaced to get a different radiation diagram (lobe change).

In view of the passage from current 2G systems to 3G systems where base stations will have to meet ever more stringent quality of service (QoS) requirements, it seems desirable to be able to benefit from the potential offered by antennas whose radiation diagram can be controlled, particularly operating remotely.

To shape the radiation diagram of an antenna, in the prior art use is made of “array” antennas. These are antennas formed by a set (array) of mutually identical radiating elements, positioned in any manner at all in space (provided that each of them radiates the signal with the same polarisation) in which, applying appropriate transformations to the transiting signal (i.e. incoming signal to be radiated or outgoing signal received by the antenna) in terms of amplitude and phase, the so-called “array effect” is obtained, i.e. the effect of shaping the radiation diagram. In particular, examining only the reception link for the moment, the signals received by each radiating element of the array are re-combined by means of an appropriate linear combination which can vary each of the involved signals in amplitude and/or phase. The selection of the coefficients used in the linear combination of the signals received by the antenna determines its radiation characteristics. These coefficients are expressed mathematically by means of complex numbers called (feeding) coefficients or weights of the array antenna. For the transmission link, the same applies in dual fashion.

If the signal processing operated by the array antenna is of the radio frequency (RF) analogue kind, the prior art relating to antennas of this nature belongs to two fundamental concepts.

In the first concept, a known solution is described, for example, in the document U.S. Pat. No. 5,917,455 in which the radiation diagram is combined by means of the combination of passive phase-shifter devices operating at RF, associated with the antenna. In particular, in the known document, the mechanical actuation of the phase-shifters is achieved by means of electromechanical actuators associated with the antenna and controlled remotely.

This solution allows to obtain phase differences on the radio frequency feeding network to the antenna elements comprising the array, thereby focusing the antenna diagram in the desired direction.

A problem of this kind of solution resides in the fact that these antennas normally allow to vary the main lobe direction of the radiation pattern only.

In the second concept of known solutions—see, by way of example, the document U.S. Pat. No. 6,366,237—the antenna diagram is controlled by means of active phase-shifters, for instance PIN (Positive-Intrinsic-Negative) diodes, and by means of adjustable gain amplifiers to get amplitude variations. In both cases, they are active RF devices associated with the antenna.

Among the critical issues of this second type of systems, there is the fact that they are prone to failures due to the delicate nature of PIN diodes. There is also the complexity of construction of such systems and the intrinsic limitation in the degrees of freedom which is typical of PIN diode phase-shifters.

An additional type of solutions relates to the case in which the signal processing operated by the antenna is of the digital type.

In this type of solutions, such as the example disclosed in the patent application US 2003/032424, the general architecture is such that to each radiating element of the antenna corresponds a conversion stage of the signal associated thereto which effects its transformation from analogue (RF) to digital and vice versa. The set of digital signals relating to each radiating element is then exchanged with the unit for the digital processing of the signal.

A problem of this type of solution resides in the high bandwidth capacity required from the physical connection between the unit for the digital processing of the signal and the antenna. In this case, since the antenna and the unit for the digital processing of the signal, for example a Radio Base Station (RBS) are typically located several metres away from each other, it is necessary to have a two-directional high capacity data link by means of coaxial or optical fibre cable, which allows them to exchange data, see for instance “High speed optical data link for Smart Antenna Radio System”, Multiaccess, Mobility and Teletraffic for Wireless Communications Conference, Venice, Italy, Oct. 6-8, 1999.

An additional example of antennas whose radiation diagram can be controlled is disclosed in the document US 2003/032454 which describes a system for sharing a signal distribution tower among multiple operators. This solution allows each of said operators to control the characteristics of the radiated beams individually.

The limitation of the prior art system is that the beamforming operation is performed far from the antenna (whether it be passive or active), at appropriate base band signal processing units (positioned for instance at the base of the antenna support tower).

For this type of solution, the problem already highlighted for the patent application US 2003/032424 also applies: in this case, too, there is the need to transport each individual signal from each radiating element of the array to the processing unit, far from the antenna, and vice versa, which implies, as described, a high capacity bi-directional link between RBS and antenna.

Purely by way of indication, one can refer to the techniques that allow to obtain adaptive array antennas or smart antennas (see, for instance, WO 9853625). In this type of solution the radiation characteristics can be selectively modified by analogue or digital processing of the signal that transits on the radio chain (transmission or reception). It is thereby possible to adapt the radiation diagram to the specific needs of a single user of a system, for instance by allowing a certain antenna to "track" with a lobe of its radiation diagram a determined user in motion. These antennas are able actively to participate in the signal broadcasting process within a mobile radio network, explicitly interacting with the coverage area, or rather with the individual users present instant by instant within said area (for general background, see for example "Smart antennas for wireless communications: IS-95 and third generation CDMA Applications", J. C. Liberti and T. S. Rappaport, Prentice Hall, 1999, Chapter 3).

The ability to adapt dynamically (hence the definition of "adaptive" antenna) the radiation diagram as a function of the number and position of users provides these new radiating systems with considerable potential for application within the field of mobile system of the second generation (2G: for example GSM, GPRS, EDGE) and of the third generation (3G: for example UMTS, CDMA2000). This is particularly true for the ability to control and limit interference levels which, for currently operational mobile systems (GSM, GPRS) is surely the most significant limitation preventing further increases in the number and quality of users/services for the same number of available spectral channels, whilst for third generation system it appears as the parameter whose control is essential in the intrinsic operation of the network, since the same frequency band is shared among the various users.

Aside from all other considerations adaptive antenna techniques are normally perceived as rather sophisticated techniques, with a sizeable processing burden associated thereto, both in terms of cost and in terms of the complex and delicate nature of the devices required for their implementation. Since the requirement to implement adaptability in real time is one of the most difficult specifications to achieve and especially to manage, use of adaptive antennas (sometimes also defined as "adaptive/smart/intelligent antenna systems") within mobile radio system is, to date, still very unusual and substantially limited to a few sporadic instances.

OBJECTS AND SUMMARY OF THE PRESENT INVENTION

The object of the present invention is to provide such a solution as to overcome the drawbacks intrinsic of prior art solutions, as outlined above, provide such a solution as to allow to obtain reconfigurable antennas which, both in terms of cost and in terms of complexity and fragility of the devices required for its implementation, can be proposed for use in normal telecommunication networks.

According to the present invention, said object is achieved thanks to a method having the characteristics specifically set out in the claims that follow. The invention also relates to the corresponding antenna, a related telecommunication network as well as a computer product which can be loaded into the memory of at least an electronic device, for instance a microprogrammable device, and containing portions of software code for implementing the method according to the invention when the product is carried out on said device.

Essentially, the solution described heretofore is based on the choice to give up the ability to optimise the operation of the system on a user base, which leads to achieve considerable simplifications at the level of the control/management of the radiating apparatus, operating on a cell basis. This is a substantially acceptable choice because it leaves unaltered the considerable advantage of being able to exploit the "reconfiguration" (reconfigurable antennas) of the radiation diagram, for example as a function of some characteristics of a mobile radio network.

According to the currently preferred embodiment of the invention, the radiation characteristics of an antenna are made configurable including in the antenna a plurality of radiating elements and associating to each of said radiating elements a respective signal processing chain in transmission and/or reception, located in proximity to the antenna or constituting an integral part thereof, comprising:

- a digital signal weighting module, capable of applying at least a (typically complex) respective weighting coefficient to a signal, and
- an antenna conversion set interposed between the digital signal weighting module and one of the radiating elements of the antenna, the conversion set operating on a digital signal on the side of the signal weighting module and on an analogue signal (typically radio frequency) on the side of the antenna element.

A signal distributed on the processing chains associated to each radiating element of the antenna propagates (in transmission and/or reception), while respective weight coefficients are applied to the aforesaid modules for weighting the digital signal. Said weighting coefficients, applied to the signal made to propagate on the transmission and/or reception chains, determined, possibly in differentiated fashion in transmission and in reception, the radiation diagram of the antenna.

A preferred embodiment of the solution described herein provides for use of a digital technique for controlling the radiating apparatuses operated remotely, fully exploiting all the degrees of freedom allowed by an array antenna.

A particularly preferred embodiment of the solution described herein provides for the presence of devices associated to the antenna (i.e. signal weighting module, antenna conversion set) and of other devices located at some distance and connected to the first devices possibly by means of fibre optic link. In this way it is possible to obtain a communication network, for instance a mobile radio network, which benefits during the planning and operational steps from the ability to modify antenna diagrams according to the needs linked to the variability of traffic conditions over time.

Compared to the prior art, the aforesaid particularly preferred embodiment introduces three main sources of advantage:

- the information for controlling the antenna beam can be transported through the same link (for instance optical fibre) used to transport the information signal, removing all redundancies in the transport of the signal over optical fibre or cable as instead is the case, as shown for the prior art, if beamforming operations are carried out far from the radiating elements;
- the signal processing apparatuses can be subdivided into two parts: on one side (at the central unit level) there is everything that is dedicated to base band (BB) and possibly intermediate frequency (IF) processing; on the other side there is the remaining processing (i.e. beamforming) up to the radio frequency (RF) level: preferably, the two parts communicate with each other by means of a fibre optic or cable link (Radio over Fibre—RoF technique);

advanced antenna systems can be introduced, able to allow generic variations (not just in terms of changing the main beam focusing) of the antenna beam.

BRIEF DESCRIPTION OF THE ACCOMPANYING DRAWINGS

Figure 2:
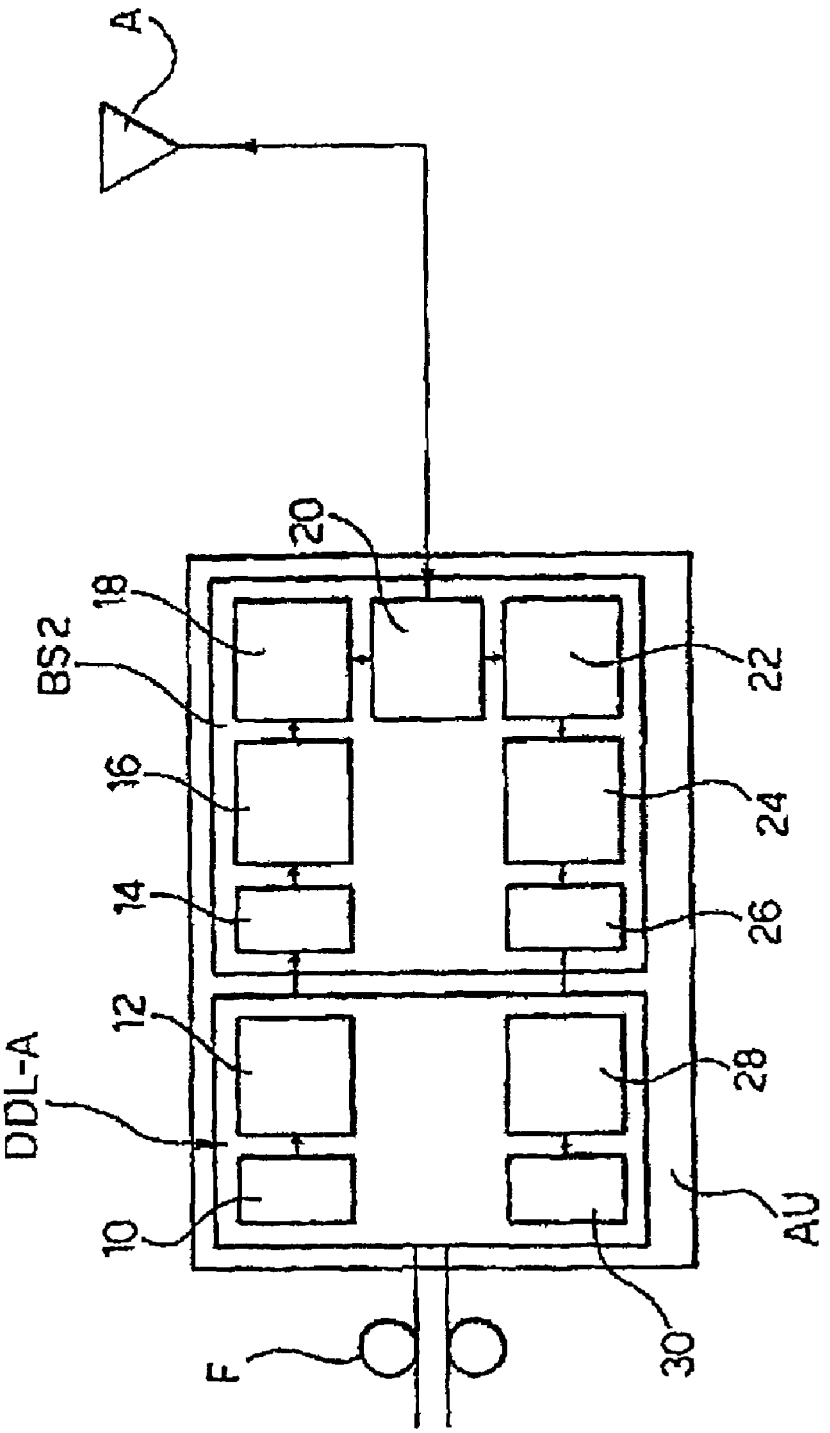
Figure 3:
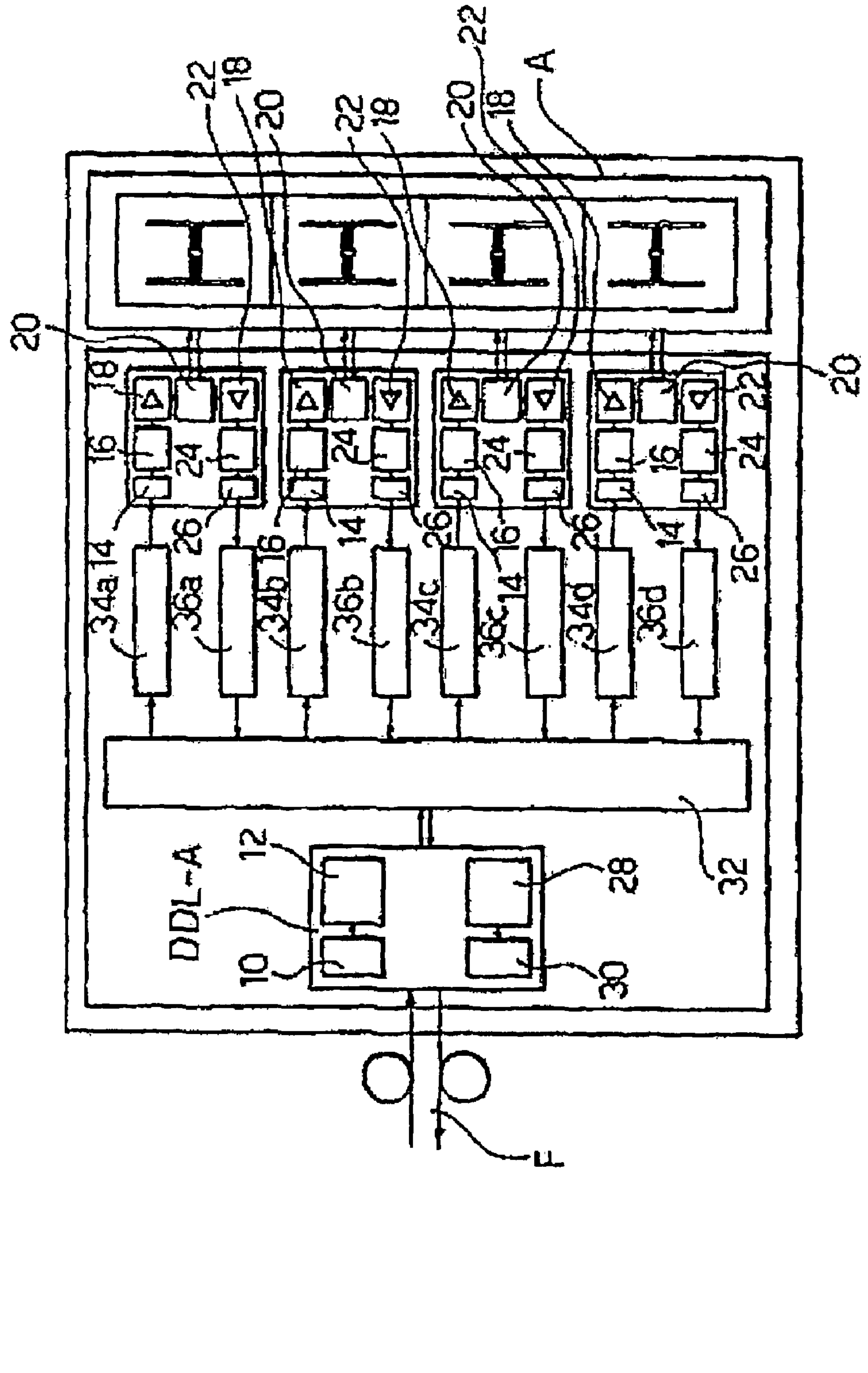
Figure 4:
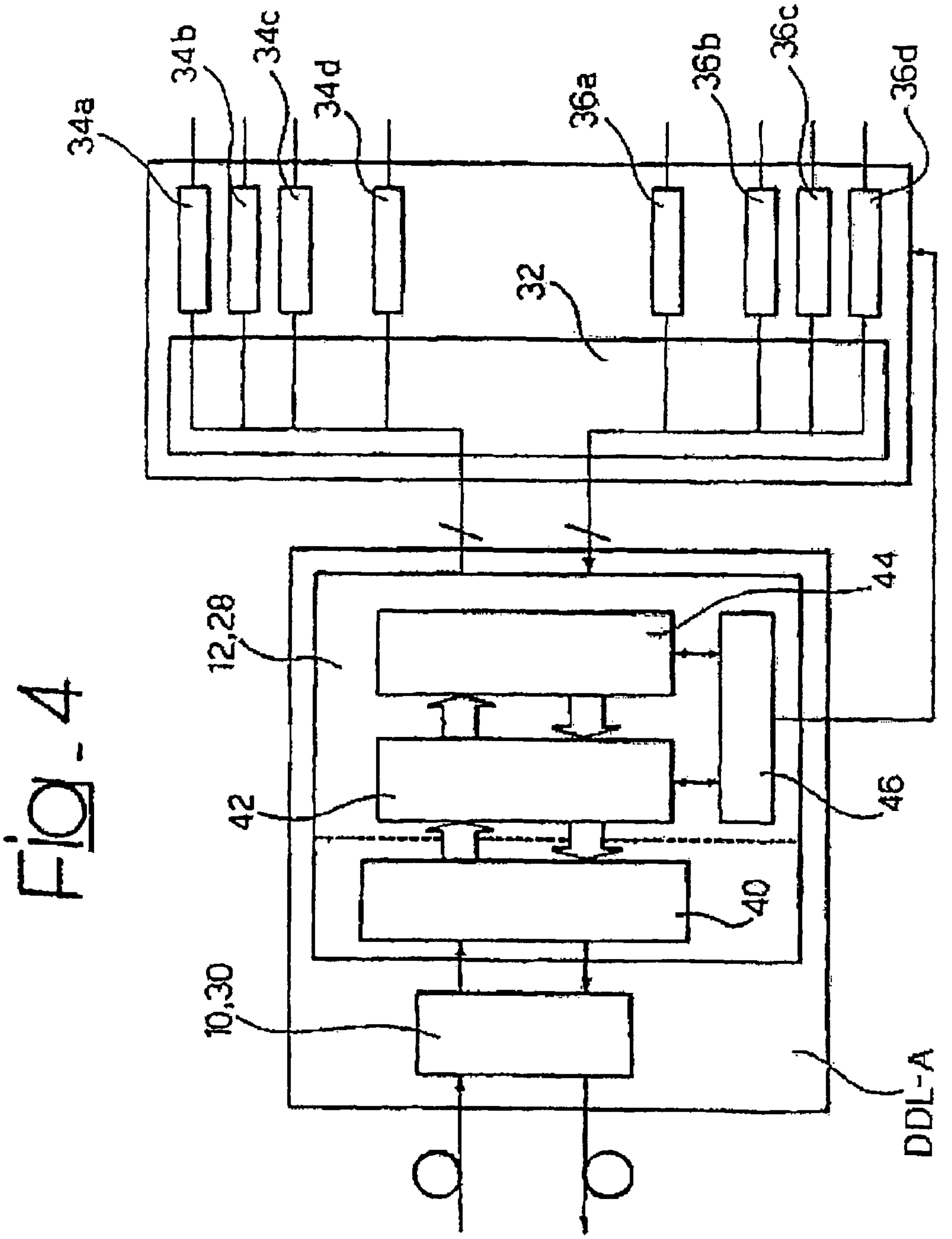

The invention shall now be described, purely by way of non limiting example, with reference to the accompanying drawings, in which:

FIG. 1 is a function block diagram proposing a direct comparison between a prior art solution and the solution described herein, FIGS. 2 and 3 develop, at the function block diagram, the comparison introduced in FIG. 1, and FIG. 4 is a function block diagram illustrating the criteria for obtaining a radio base station that implements the solution described herein.

DETAILED DESCRIPTION OF A PREFERRED EMBODIMENT OF THE INVENTION

The detailed description that follows uses as reference general principles of antenna array theory, as presented, for example, in the reference text:

Y. T. Lo, S. W. Lee, Ed., "Antenna handbook—Theory, applications and design", Van Nostrand Reinhold, New York 1988 (in particular in Chapters 11, 13, 14, 18, 19), and in the literature available to those versed in the art of constructing such antennas.

Well known synthesis techniques such as, for instance, the techniques known as Dolph-Chebyshev, Taylor, Woodward-Lawson methods can be used to design such antennas. These well known techniques shall not be the subject of a detailed description herein.

For the purposes of the present description, it will suffice to recall that a configurable remotely controlled antenna is, for example, an antenna in which the setting of the power supply coefficients or weights, applied to each radiating element, is varied operating remotely; in this case this is a concept that has already been applied to a cellular network for mobile communications or mobile radio network: for example, the previously mentioned document U.S. Pat. No. 6,366,237 provides for remotely controlling the tilt of the main beam of an antenna by means of components, called phase-shifters, which act in RF.

A significant advantage of the solution described herein (which is applicable not only to mobile radio networks, but also when the radiation characteristics of an antenna has to be configured), is given by the capability of processing the signal that achieves the array effect in digital fashion, both operating in Base Band (BB) and operating at Intermediate Frequency (IF), close to the antenna or in an apparatus that is integrated therewith, thanks to diagram control information provided remotely.

According to the architecture described herein by way of currently preferred embodiment example, a radio base station SRB is considered in which there is the transport, through a same fibre optic link, both of the data signal and of the control signal of the antenna radiation diagram (both in digital format) towards an apparatus (Antenna Unit or AU) positioned as close as possible to the antenna, if not integrated therein.

Thus, this solution could be implemented with Radio Over Fibre technique, but not exclusively: any kind of link, for instance also with a coaxial cable having the necessary transmissive capacity, is suitable for the requirements.

This concept is highlighted in FIG. 1, where the part on the left, designated a), schematically shows a base station configuration according to the prior art, whilst the part on the right, designated b), schematically shows a base station configuration according to the solution described herein, in which, for the sake of simplicity, only the graphic object called A has been introduced to represent the array antenna without detailing the cables relating to each radiating elements (i.e. without specifying the type of beamforming applied).

In general, it will be assumed here that the functional elements illustrated below are able to operate both in transmission (down-link—DL) and in reception (up-link—UL). For this reason, hereafter the two operating modes present in each block shall be highlighted.

Considering first the transmission functionality (DL), in both parts of FIG. 1, BS1 is a known function block able to generate a useful (data/information) signal and a control signal (detection of the operating status of all apparatuses present in the system), as well as—in the case of the solution of FIG. 1*b*—also the information required to achieve the reconfigurability of the antenna A. Both signals in question are in digital format.

The reference DDL-C (Digital Data Link-Central side) designates a known function block able to receive an electric signal in digital format, to arrange it in frames, for instance according to Synchronous Digital Hierarchy (SDH), to serialise it and to convert it into an optical signal suitable to be sent on optical fibre F.

The reference DDL-A (Digital Data Link-Antenna side) designates a known function block which, performing the operations carried out by the block DDL-C in reverse order and manner, exactly returns (barring any transmission errors along the optical fibre) the electrical signal in digital format received by the DDL-C block.

BS2 is a function block constituted by a digital signal processing unit and by an analogue treatment unit which receives as an input a single electrical signal in digital formed in view of feeding it to the antenna A by means of an RF signal.

In a traditional solution (FIG. 1*a*), the block BS2, destined to feed the radiating element constituted by the antenna A, essentially comprises:

- a digital-analogue converter
- a frequency conversion stage (mixer, filters, etc.) which brings the signal to RF;
- an RF power amplifier;
- a possible duplexer (generally passive component which allows to separate the transmission and reception streams connected with an antenna) if the transmissive technique is FDD (Frequency Division Duplex) or a switch if the transmissive technique is TDD (Time Division Duplex).

In the case of the innovative solution described herein (FIG. 1*b*) the block BS2 is able to generate a certain number of appropriately reprocessed replicas of the signal brought to its input. Each replica feeds the corresponding transmissive chain (D/A converter, frequency conversion stage, RF power amplifier, duplexer or switch) of the kind described above, connected in turn to the respective antenna element.

In dual fashion, considering the reception functionality (UL) and referring for the sake of simplicity only to the innovative solution described herein, the block BS2 receives from the radiating element A a certain number of signals coming from the radiating elements of the antenna, letting the received signals pass through a receiving chain comprising:

the possible duplexer already described above, constituted for example by a generally passive component which allows to separate the transmission and reception streams in the case of FDD technique or by a switch in the case of TDD technique;

a Low Noise RF Amplifier;

a frequency conversion stage (mixer, filters, etc.) to bring the signal to lower frequencies (Intermediate Frequency or Base Band) where it can be converted to digital format; and an analogue-digital converter.

In reception (UL) the DDL-A block receives as an input an electrical signal in digital format and organises it into frames, for instance according to the synchronous hierarchy SDH, to serialise it and to convert it into an optical signal suitable to be sent on the optical fibre F.

Also in reception (UL), the block DDL-C performs in reverse order and fashion the operations carried out by the block DDL-A and exactly returns (barring any transmission errors along the optical fibre) the electrical signal in digital format which the block DDL-A had received at its input.

Lastly, in reception, the block BS1 generates, starting from the signal received from the block DDL-C, a useful (information) signal and a control signal, both in digital format.

In the case of the innovative solution described herein (FIG. 1*b*), the block BS2 is able appropriately to recombine the RF signals received by each of the radiating elements of the antenna by weighting the signals (recombination is carried out in digital mode), to produce a signal, resulting from the weighting or reconfiguration, to be passed on the BS1.

Those versed in the art will appreciate that, in some possible embodiments, the components present in the block BS2 which perform, respectively in transmission and in reception, the functions of radiating element, of duplexer or switch and of digital signal processing can be mutually integrated.

The above is further highlighted in the representations of FIGS. 2 and 3, which refer respectively to a known solution (without antenna reconfiguration, even in the presence of signal transport on optical fibre) and to the innovative solution described herein (with antenna reconfiguration).

In particular, FIG. 2 shows that, in transmission (DL) the information signal outgoing from the block BS1 (by construction already in digital form) passed to the module DDL-C which appropriately packages the signal (mapping, framing, serialising) and converts it into optical format is received through the optical fibre (F) link by the module DDL-A.

Once it reaches DDL-A, the signal undergoes the reverse transformations with respect to those it underwent in DDL-C, i.e. transformation from optical to electrical (module 10), reverse mapping and framing and lastly de-serialisation (module 12), thereby returning the same digital electrical signal available at the output of BS1, ideally unaltered (actually, typical Bit Error Rates for optical links is not equal to zero, but it certainly is quite low, for example in the order of $10^{-12}$) and ready to go through the typical stages that will have to bring it to RF, i.e. D/A conversion (module 14), frequency conversion from BB or IF to RF (module 16) and lastly power amplification (module 18), before accessing the duplexer (or switch) 20 and, thence, to the antenna A to be radiated.

Similar, albeit reversed, is the path of the information signal in reception (UL) coming from the antenna A, thus passing, in order, through:

the duplexer or switch 20, a low noise RF amplifier 22, a downward frequency converter (down converter) 24, an A/D converter 26.

It will be appreciated that, before entering DDL-A, the signal outgoing from BS2 can be sampled and discretised, i.e. converted in digital signal, operating either in base band (BB) or in intermediate frequency (IF).

In the block DDL-A the signal is subjected, in a module 28, to processing operations which are complementary to those carried out in the module 12 and lastly converted into optical form in a module 30 in view of its transmission towards DDL-C through the fibre F.

The above substantially holds true also for the innovative solution shown in FIG. 3, where identical references were used to indicate elements that are identical or equivalent to those already described with reference to FIG. 2.

Essentially, while maintaining an identical structure for the module DDL-A, in the solution described in FIG. 3 the set of parts designated as BS2 in FIG. 2 (modules 14 through 26) is multiplexed in the form of a certain number of identical blocks (in the number of four, in the embodiment illustrated herein). Each of the blocks in question is able to be connected to a respective radiating element of the antenna A.

In this case, in transmission, the signal outgoing from the module DDL-A (which is a digital signal) is processed in digital fashion in the following way:

the signal is replicated, by means of a splitter(DL)/combiner(UL) 32 as many times as the desired degrees of freedom through which the antenna diagram is to be controlled (equal to the number of weights, typically equal to the number of radiating elements of the array, i.e. four in the example considered herein);

to each replica is applied, in a corresponding weighting module 34*a*, 34*b*, 34*c* and 34*d*, a related weight (generally complex, i.e. expressible in terms of module and phase) set in a control unit CU located in the block BS1, selected according to known criteria, for instance in such a way as to meet determined requirements in terms of coverage of the territory served by the radio base station (cell);

each weighted replica of the signal, independently of the others, goes through the necessary stages that will bring it to RF: D/A conversion (module 14), frequency conversion from BB or IF to RF (module 16) and lastly power amplification (module 18) before accessing the duplexer or switch 20 and, thence, to the corresponding element of the array antenna A to be radiated.

In some situations, in particular when the radiation diagram of the antenna A is to be subjected solely to a variation of the beam inclination, or tilt, the total power output by the amplifiers 18 assigned to each radiating elements can be reduced to the power output in the traditional system—where there is a single power amplifier along the radio chain—divided by the number of weights introduced.

What is stated above with reference to operation in transmission (DL) applies in dual fashion in reception (UL), where the digital signals outgoing from the individual converters 26 are subjected to weighting in respective weighting modules 36*a*, 36*b*, 36*c* and 36*d*, operating in "homologous" fashion with respect to the modules 34*a*, 34*b*, 34*c* and 34*d* seen previously, to be subsequently made to converge towards the splitter(DL)/combiner(UL) 32 which recombines them in view of the transfer to the module DDL-A.

Reference to a "homologous" behaviour of the weighting modules 36*a*, 36*b*, 36*c* and 36*d* with respect to the modules 34*a*, 34*b*, 34*c* and 34*d* expresses merely the similar nature of the function and hence should not be construed to mean that the shape of the radiation diagram used in transmission (given by the coefficients applied in the weighing modules 34*a*, 34*b*, 34*c* and 34*d*) and the shape of the radiation diagram used in reception (given by the coefficients applied in the weighting modules 36*a*, 36*b*, 36*c* and 36*d*) should be mutually identical. The solution described herein allows to utilise, if it is useful or necessary, different radiation diagrams in transmission and in reception.

Referring jointly to FIG. 3 and to FIG. 4 (which reproduces, designated by the same references, some of the elements already introduced in FIG. 3, presented herein according to a different graphic organisation) it is observed that—referring for the sake of simplicity to transmission (DL) alone, since reception (UL) operates in symmetrical fashion—at the input of the module DDL-A there is an optical signal to be converted into electrical through the module 10 (for the UL, there is an electro-optical conversion to be performed by means of the module 30) and the output converter has a signal in digital format.

To perform transport over fibre, it is necessary to organise the data in a format that is compatible with the transmission standard, and consequently immediately after the optical-electrical conversion it is necessary to eliminate formatting (framing or inverse mapping): these operations are conducted in respective modules 40, 42, 44 represented in FIG. 4 as able to operate both in transmission and in reception.

The processed signal is the result of the bundling of two digital streams, the first one constituted by the data signal and the second one by the control signal which, among the other functions, also serves the function of transporting the weight coefficients which are to be applied to each radio chain: a demultiplexer module 46 separates these two parts.

At this point, inside the digital signal processing unit, the data stream is replicated as many times as there are radiating elements in the antenna: thence the digital signals, after the processing described below, continue in parallel until reaching the antenna A (or, more specifically, a respective antenna element).

After isolating the signal related to each chain, it is processed by means of its weight coefficient: this operation is schematically illustrated by means of the modules 34*a*, 34*b*, 34*c* and 34*d*. The specific details of the processing operations performed within these blocks depend on having at the input of the module DDL-A a base band or intermediate frequency signal: in any case said implementation details are beyond the scope of the present invention.

After weighting, the digital signal corresponding to each transmission chain, output by the unit for the digital processing of the signal (for instance FPGA) continuous in traditional fashion (digital-analogue conversion, modulation and translation to RP, power amplification) in order to generate the radio signal to be sent to the radiating elements.

Operation in reception is—as seen previously—wholly dual.

In the solution described herein, all operations to be performed on the signal, from the time it is reconverted into an electrical signal until just before it is reconverted from digital to analogue and brought to radio frequency, can be performed by means of one or more digital signal processing units (FPGA, ASIC, DSP).

The application of the weights (or "beamforming"), in addition to being different between the DL and UL links, can also differ according to whether it is operated on signals in BB or IF. Both methodologies can be applied to such a system, which relate to the cases in which the choice is made to transport on optical fibre signals respectively in BB or IF.

For additional details about the base band (BB) signal processing technique, reference can usefully be made to "Beamforming: a versatile approach to spatial filtering", B. D. Van Veen, K. M. Buckley, IEEE ASSP Magazine, April 1988.

The system described herein is clearly in no way limited to the type or type of radiation diagram obtained: weight selection is conducted outside the system which, through the module BS1, causes them to be provided to BS2 and applied to the array.

The system described herein is therefore valid in general, whether beamforming is to be achieved in the azimuth (horizontal) or elevation (vertical) planes, or in both, and it also remains whatever the geometric arrangement of the radiating elements of the antenna which can be planar or conformal. Beamforming can be achieved, for example, by means of a two-dimensional matrix of radiating elements and, for each radiating element, a corresponding signal processing chain according to the present invention.

Radiation diagram synthesis by means of beamforming both in elevation and in azimuth is not described in detail herein, because it is known from the literature dedicated to the matter.

An additional consideration is that currently used and/or foreseen radio base stations for 2G and 3G are constituted by apparatuses for processing the signal at the various frequencies (BB, IF, RF) and by a radiating system which can be of two kinds:

- with fixed beamforming (the most common one in absolute terms),
- with beamforming that is variable practically only in terms of modifying the inclination in the vertical or elevation plane (tilt), or the main focusing direction, and controllable locally or remotely.

In both cases, however, the information signal is transported via radio frequency from and to the antenna by using low-loss coaxial electrical cables (typically very voluminous and costly), whilst control ver beamforming is achieved by means of a command, which may be remotely operated, implemented with the aid of an electromechanical actuator (in this case, control commands can travel in various ways: serial line, the same coaxial cable used for the information signal, etc.).

The most obvious consequence of the separation of the processing unit into two sub-units connected to each other via an optical fibre, as described herein, is that they can be located in positions that are even quite distant from each other: for example, the first one at the base of a building or in a central location, whilst the second one is always positioned as closely as possible to the radiating system.

It thereby also becomes realistic to imagine locating multiple remote units along the same optical fibre ring, with benefits in terms of ease of optimisation of the radio resources and reduction in installation and operation costs, exploiting, for instance, the opportunities offered by optical signal multiplexing techniques (WDM).

The solution whereby the signal is transported between the two processing sub-units is not in itself bound to the choice of operating with analogue or digital signals, however a preference in favour of transporting said digital signals can be suggested by reasons of greater economy of the optical apparatuses usable in this context.

The possibility of positioning apparatuses close to the radiating systems, as well as the elimination of the coaxial cables which, no matter how high their performance, cause a not inconsiderable attenuation of the signal have the important consequence of allowing a significant reduction in the powers output by the RF power amplifiers (HPA), with important advantages in terms of electrical energy consumption, heat dissipation (and hence temperature management in the AU apparatus) and size and operating cost reduction.

All the benefits deriving from the reduction of the power output by the RF amplifiers are further emphasised if use is made of the advanced antenna systems provided by the present invention. In this case, use is not made of a single RF amplifier, but rather there must be one for each radiating element, each able to output a maximum power that is typically less than that output by the single amplifier (this is particularly true if only the phase shifts on the radio frequency power supplies of the individual radiating elements are varied).

Naturally, without altering the principle of the invention, the construction details and the embodiments may be varied widely from what is described and illustrated herein, without thereby departing from the scope of the present invention, as defined in the appended claims.

The invention claimed is:

1. A method for configuring radiation characteristics of an antenna, said antenna including a plurality of radiating elements, wherein each of said radiating elements is associated with at least a respective signal processing chain located in an antenna unit that is integral to the antenna, said at least one respective signal processing chain comprising:

at least one module for weighting digital signals, the at least one module configured to apply at least a weighting coefficient to a digital signal; and at least one antenna conversion set interposed between said at least one module for weighting digital signals and a respective one of the radiating elements of the antenna, said antenna conversion set being configured to convert between digital signals processed by the at least one module for weighting digital signals and analog signals transmitted and received at the respective one of the radiating elements, the method comprising:

receiving, at the antenna unit, a data signal and a control signal on the same communication link, the data signal corresponding to one or more digital signals to be processed in the antenna unit and the control signal including information indicating at least one of the weighting coefficients applied by the at least one modules for weighting digital signals;

configuring at least one weighting coefficient in the at least one modules for weighting digital signals based on the information received at the antenna unit; and applying respective weighting coefficients to digital signals in each of the at least one module for weighting digital signals, said weighting coefficients determining the radiation characteristics of the antenna.

2. The method as claimed in claim 1, wherein the at least one module for weighting digital signals includes first and second modules for weighting digital signals and the at least one antenna conversion set includes first and second antenna conversion sets, said first module for weighting digital signals and first antenna conversion set operating on a signal transmitted by said radiating elements of the antenna, said second module for weighting digital signals and second antenna conversion set operating on a signal received from said radiating elements of said antenna.

3. The method as claimed in claim 2, comprising the step of associating said first and second antenna conversion sets with signal distribution elements capable of operating both on signals transmitted and received at said antenna.

4. The method as claimed in claim 3, comprising the step of choosing at least one of said signal distribution elements from a group of radio frequency duplexers and switches.

5. The method as claimed in claim 2, comprising the step of applying weighting coefficients in said first and second modules for weighting digital signals such that the antenna employs the same radiation pattern for signal transmission and reception.

6. The method as claimed in claim 2, comprising the step of applying weighing coefficients in said first and second modules for weighting digital signals such that the antenna employs different radiation patterns for signal transmission and reception.

7. The method as claimed in claim 1, comprising the step of including in said antenna conversion set at least a component that converts a signal between a radio frequency and base band.

8. The method as claimed in claim 1, comprising the step of including in said antenna conversion set at least a component that converts a signal between a radio frequency and an intermediate frequency.

9. The method as claimed in claim 1, comprising the steps of:

generating a plurality of replications of a signal to be transmitted by said antenna; and sending said replications of the signal on respective signal processing chains associated with said radiating elements of the antenna.

10. The method as claimed in claim 1, further comprising:

receiving a plurality of signals at the radiating elements of the antenna;

processing each of the plurality of signals received at the radiating elements using a respective signal processing chain; and combining the plurality of received signals processed by the signal processing chains to form a single received signal.

11. The method as claimed in claim 1, comprising the steps of:

receiving, at the antenna unit, a signal incorporating the information indicating at least one of the weighting coefficients; and extracting, at the antenna unit, said at least one weighting coefficient from the received signal.

12. The method as claimed in claim 1, comprising the steps of:

receiving, at the antenna unit, an optical signal; and converting the received optical signal into an electrical signal capable of being processed by said signal processing chains associated with said radiating elements of the antenna.

13. The method as claimed in claim 12, comprising the step of including in the optical signal the information indicating at least one of the weighting coefficients.

14. The method as claimed in claim 1, comprising the step of placing the antenna unit in close proximity to the antenna.

15. An antenna with configurable radiation characteristics, the antenna comprising:

a plurality of antenna radiating elements; and an antenna unit integral to the antenna and comprising one or more signal processing chains associated with the plurality of radiating elements, the antenna unit further comprising:

at least one module for weighting digital signals, the at least one module configured to apply at least a weighting coefficient to a digital signal;

at least one antenna conversion set interposed between said at least one module for weighting digital signals and a respective one of the radiating elements of the antenna, said antenna conversion set being configured to convert between digital signals processed by the at least one module for weighting digital signals and analog signals transmitted and received at the respective one of the radiating elements; and an interface configured to receive a data signal and a control signal on the same communication link, the data signal corresponding to one or more digital signals to be processed in the antenna unit and the control signal including information indicating at least one of the weighting coefficients applied by the at least one modules for weighting digital signals, wherein the weighting coefficients applied by the at least one modules for weighting digital signals determine the radiation characteristics of the antenna.

16. The antenna as claimed in claim 15, wherein said one or more signal processing chains comprises first and second modules for weighting digital signals as well as first and second antenna conversion sets, said first module for weighting digital signals and first antenna conversion set operating on a signal transmitted by said radiating elements of the antenna, said second module for weighting digital signals and second antenna conversion set operating on a signal received from said radiating elements of said antenna.

17. The antenna as claimed in claim 16, wherein the antenna unit further comprises:

at least one weighting control block configured to apply weighting coefficients in said first and second modules for weighting digital signals, such that the antenna employs the same radiation pattern for signal transmission and reception.

18. The antenna as claimed in claim 16, wherein the antenna unit further comprises:

at least one weighting control block configured to apply weighting coefficients in said first and second modules for weighting digital signals, such that the antenna employs different radiation patterns for signal transmission and reception.

19. The antenna as claimed in claim 16, wherein said first and second antenna conversion sets are associated with signal distribution elements capable of operating both on signals transmitted and received at said antenna.

20. The antenna as claimed in claim 19, wherein at least one of said signal distribution elements is selected from a group of radio frequency duplexers and switches.

21. The antenna as claimed in claim 15, wherein said antenna conversion set comprises at least one frequency converter that converts a signal between a radio frequency and base band.

22. The antenna as claimed in claim 15, wherein said antenna conversion set comprises at least one frequency converter that converts a signal between a radio frequency and an intermediate frequency.

23. The antenna as claimed in claim 15, comprising a distributing element configured to:

generate a plurality of replications of a signal to be transmitted by said antenna; and distribute said replications of the signal on respective signal processing chains associated with said radiating elements of the antenna.

24. The antenna as claimed in claim 15, wherein the antenna unit further comprises at least one element configured to combine a plurality of signals received at the radiating elements and subsequently processed by the signal processing chains, thereby forming a single received signal.

25. The antenna as claimed in claim 15, comprising an extraction module configured to extract said information indicating at least one of the weighting coefficients applied by the modules for weighting digital signals.

26. The antenna as claimed in claim 15, wherein said antenna unit is located in close proximity to the antenna.

27. The antenna as claimed in claim 15, wherein the antenna unit further comprises:

an electro-optical converter module configured to convert an optical signal received at the interface into an electrical signal capable of being processed by said signal processing chains associated with said radiating elements of the antenna.

28. The antenna as claimed is claim 27, wherein said electro-optical converter module is associated with an extraction module configured to extract said information indicating at least one of the weighting coefficients applied by the modules for weighting digital signals.

29. The antenna as claimed in claim 15, wherein the interface is a digital data link.

30. The antenna as claimed in claim 29, wherein the digital data link is an optical fiber.

31. An apparatus comprising an antenna, the antenna comprising:

a plurality of antenna radiating elements; and an antenna unit integral to the antenna and comprising one or more signal processing chains associated with the plurality of radiating elements, the antenna unit further comprising:

at least one module for weighting digital signals, the at least one module configured to apply at least a weighting coefficient to a digital signal;

at least one antenna conversion set interposed between said at least one module for weighting digital signals and a respective one of the radiating elements of the antenna, said antenna conversion set being configured to convert between digital signals processed by the at least one module for weighting digital signals and analog signals transmitted and received at the respective one of the radiating elements; and an interface configured to receive a data signal and a control signal on the same communication link, the data signal corresponding to one or more digital signals to be processed in the antenna unit and the control signal including information indicating at least one of the weighting coefficients applied by the at least one modules for weighting digital signals, wherein the weighting coefficients applied by the at least one modules for weighting digital signals determine radiation characteristics of the antenna.

32. The apparatus as claimed in claim 31, further comprising:

a control unit and an optical link for the transmission of an optical signal between said control unit and an electro-optical converter module associated with said antenna.

33. The apparatus as claimed in claim 31, wherein the apparatus is a radio base station.

34. A telecommunications network comprising at least an antenna, the antenna comprising:

a plurality of antenna radiating elements; and an antenna unit integral to the antenna and comprising one or more signal processing chains associated with the plurality of radiating elements, the antenna unit further comprising:

at least one module for weighting digital signals, the at least one module configured to apply at least a weighting coefficient to a digital signal;

at least one antenna conversion set interposed between said at least one module for weighting digital signals and a respective one of the radiating elements of the antenna, said antenna conversion set being configured to convert between digital signals processed by the at least one module for weighting digital signals and analog signals transmitted and received at the respective one of the radiating elements; and an interface configured to receive a data signal and a control signal on the same communication link, the data signal corresponding to one or more digital signals to be processed in the antenna unit and the control signal including information indicating at least one of the weighting coefficients applied by the at least one modules for weighting digital signals, wherein the weighting coefficients applied by the at least one modules for weighting digital signals determine radiation characteristics of the antenna.

35. A computer-readable medium comprising instructions for execution by a processor, the instructions comprising portions of software codes capable of implementing a method for configuring radiation characteristics of an antenna, the method comprising the steps of:

receiving, at an antenna unit integral to the antenna, a data signal and a control signal on the same communication link, the data signal corresponding to one or more digital signals to be processed in the antenna unit and the control signal including information indicating at least one weighting coefficient to be applied by modules for weighting digital signals that are housed within the antenna unit;

configuring at least one weighting coefficient in the modules for weighting digital signals based on the information received at the antenna unit; and applying respective weighting coefficients to digital signals in each of the modules for weighting digital signals, said weighting coefficients determining the radiation characteristics of the antenna.

36. A method for configuring radiation characteristics of an antenna, the method comprising:

receiving, at an antenna unit integral to the antenna, a data signal and a control signal on the same communication link, the data signal corresponding to one or more digital signals to be processed in the antenna unit and the control signal including information indicating at least one weighting coefficient to be applied by modules for weighting digital signals that are housed within the antenna unit;

configuring at least one weighting coefficient in the modules for weighting digital signals based on the information received at the antenna unit; and applying respective weighting coefficients to digital signals in each of the modules for weighting digital signals, said weighting coefficients determining the radiation characteristics of the antenna.

37. The method as claimed in claim 36 further comprising:

replicating a digital signal to generate a plurality of digital signals; and distributing each of the generated digital signals to a different module for weighting digital signals.

* * * * *